United States Patent
Zhao et al.

(10) Patent No.: US 7,876,661 B2
(45) Date of Patent: Jan. 25, 2011

(54) NON-DESTRUCTIVE READBACK FOR FERROELECTRIC MATERIAL

(75) Inventors: Tong Zhao, Pittsburgh, PA (US); Martin G. Forrester, Murrysville, PA (US); Florin Zavaliche, Pittsburgh, PA (US); Dierk Guenter Bolten, Pittsburgh, PA (US); Andreas Karl Roelofs, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 528 days.

(21) Appl. No.: 11/865,878

(22) Filed: Oct. 2, 2007

(65) Prior Publication Data

US 2009/0086613 A1 Apr. 2, 2009

(51) Int. Cl.
*G11B 7/00* (2006.01)
(52) U.S. Cl. ........................ 369/126; 977/947
(58) Field of Classification Search .............. None
See application file for complete search history.

(56) References Cited

U.S. PATENT DOCUMENTS

| | | | | |
|---|---|---|---|---|
| 3,858,307 A | * | 1/1975 | Yoshimura et al. | 29/594 |
| 5,132,934 A | * | 7/1992 | Quate et al. | 369/126 |
| 6,515,957 B1 | | 2/2003 | Newns et al. | |
| 6,683,803 B2 | | 1/2004 | Gudesen et al. | |
| 6,937,499 B2 | | 8/2005 | Nordal et al. | |
| 7,154,768 B2 | | 12/2006 | Chen et al. | |
| 7,626,846 B2 | * | 12/2009 | Rao et al. | 365/145 |
| 2005/0128616 A1 | * | 6/2005 | Johns et al. | 360/15 |
| 2006/0023606 A1 | * | 2/2006 | Lutwyche et al. | 369/100 |
| 2008/0192528 A1 | * | 8/2008 | Siegert et al. | 365/145 |

OTHER PUBLICATIONS

S. V. Kalinin et al., "Local Potential And Polarization Screening On Ferroelectric Surfaces", *Physical Review B*, vol. 63, 2001, pp. 125411-1-125411-13.

* cited by examiner

*Primary Examiner*—Peter Vincent Agustin
(74) *Attorney, Agent, or Firm*—Benjamin T. Queen, II; Pietragallo Gordon Alfano Bosick & Raspanti, LLP

(57) ABSTRACT

An apparatus that provides for non-destructive readback of a ferroelectric material. The apparatus can include a ferroelectric layer with a scannable surface wherein the ferroelectric layer has a compensation charge adjacent the scannable surface. The apparatus also can include an electrode adjacent the scannable surface to sense the compensation charge. A related method is also disclosed.

21 Claims, 4 Drawing Sheets

NON-DESTRUCTIVE READBACK FOR FERROELECTRIC MATERIAL

BACKGROUND

Ferroelectric materials can form the basis for data storage wherein, for example, binary "1" and "0" levels are represented by the electric polarization of a ferroelectric film pointing "up" or "down". A data storage device that utilizes, for example, a ferroelectric storage medium can include an electrode, which also may be referred to as a transducer, a probe, or a probe tip, that is movable relative to the storage medium. The storage medium may include a substrate, an electrode layer and a ferroelectric storage layer. The binary "1" and "0" are stored by causing the polarization of the ferroelectric film to point "up" or "down" in a spatially small region or domain local to the electrode. Data can then be read out by, for example, applying a voltage of a magnitude and polarity such as to cause the polarization to point "up". The domains polarized "down" (e.g. representing "0"), will then switch to the "up" state, and a charge will flow which is proportional to the remanent polarization of the ferroelectric. Domains polarized "up" will have no such current flow. The presence or absence of this current flow, as determined by a sense amplifier, can then be used to determine whether the domain had contained a "1" or "0". This type of readback is generally referred to as "destructive readback."

SUMMARY

An aspect of the present invention is to provide an apparatus that includes a ferroelectric layer with a scannable surface and an electrode adjacent the scannable surface. The ferroelectric layer has a compensation charge adjacent the scannable surface that is sensed by the electrode.

Another aspect of the present invention is to provide a method that includes providing a ferroelectric layer with a scannable surface and an electrode adjacent the scannable surface. The method further includes sensing a compensation charge that is adjacent the scannable surface of the ferroelectric layer.

A further aspect of the present invention is to provide a circuit that includes a ferroelectric electrode scanning system having data stored thereon with a data polarity wherein the scanning system senses a compensation charge as a function of the data polarity. The circuit further includes an amplifier that receives the compensation charge and provides a corresponding amplified output, and a detector that receives the amplified output and generates a detector output that indicates the data polarity.

These and various other features and advantages will be apparent from a reading of the following detailed description.

DRAWINGS

DETAILED DESCRIPTION

In the aspects described herein, a ferroelectric material layer such as, for example, a ferroelectric data storage layer, is scanned with an electrode. The data stored on the ferroelectric data storage layer can be read as a function of compensation charges that exist adjacent a scannable surface of the ferroelectric data storage without erasing the data.

Figure 1:
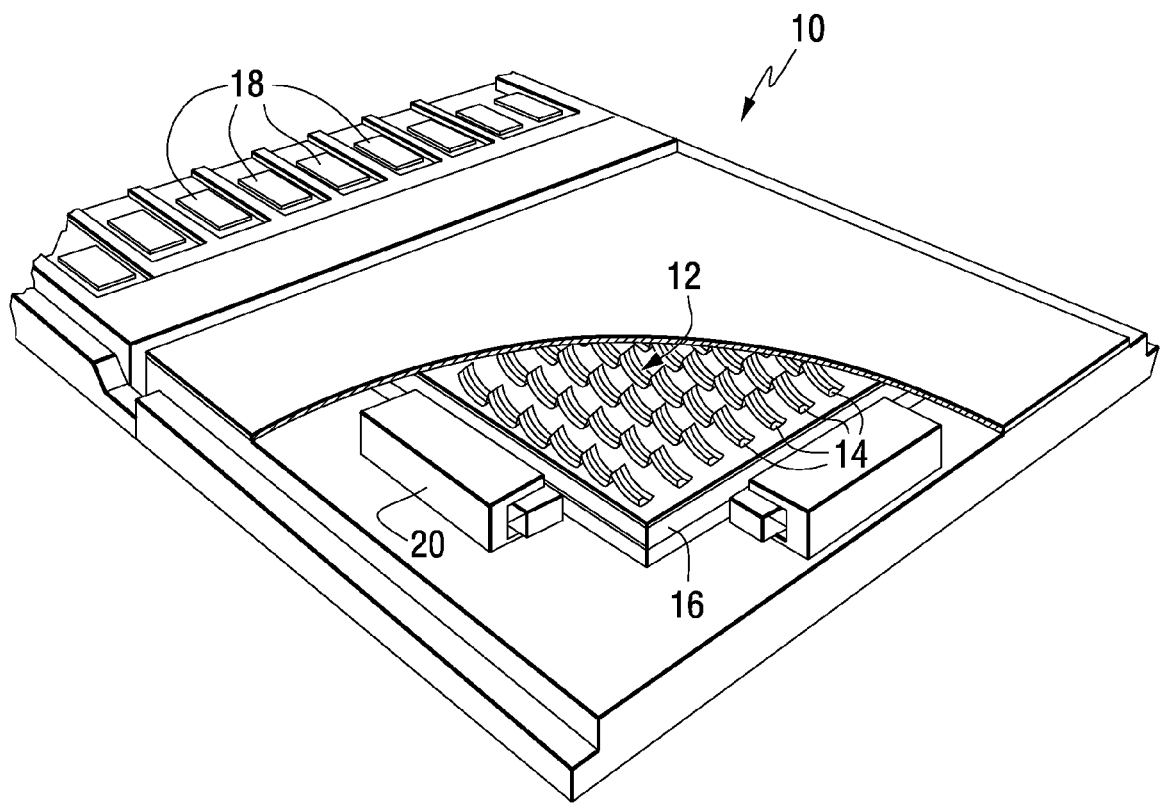
FIG. 1 illustrates a device, in accordance with an aspect of the invention.

FIG. 1 illustrates an exemplary ferroelectric data storage device 10 in which aspects of the invention are useful. The device 10 includes a ferroelectric storage medium 16 with a scannable surface 12. An array of electrodes 14 contact the scannable surface 12 and communicate data to and from the scannable surface 12. Microactuators, such as microactuator 20, provide relative scanning motion between the scannable surface 12 and the electrodes 14. Electrical contacts 18 provide connections between the device 10 and a host computer system or other type system that may incorporate the device 10.

Figure 2:
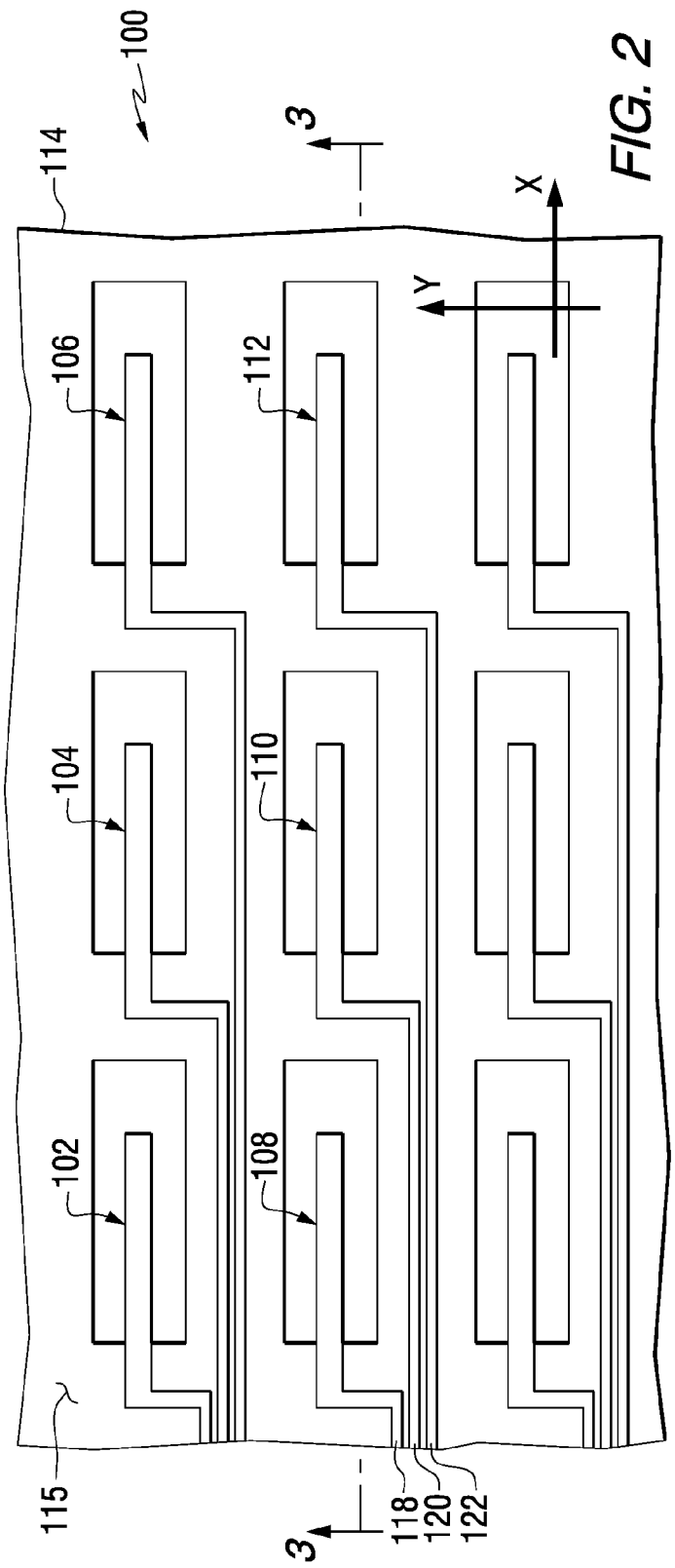
FIG. 2 illustrates a plan view of an array of sensing contact electrodes, in accordance with an aspect of the invention.
Figure 3:
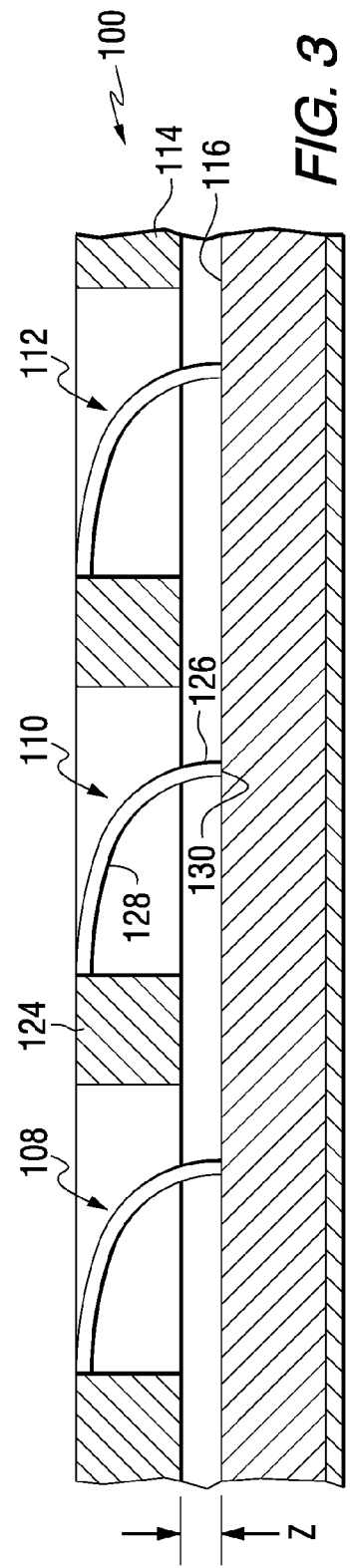
FIG. 3 illustrates a cross sectional view taken along line 3-3 of FIG. 2, in accordance with an aspect of the invention.

FIGS. 2 and 3 illustrate an array 100 of sensing contact electrodes 102, 104, 106, 108, 110, 112 that are formed in cavities of a substrate 114. FIG. 2 illustrates a top (plan) view of the array 100, and FIG. 3 illustrates a cross-sectional view taken along line 3-3 in FIG. 2.

The substrate 114 provides a common electrode support for the sensing contact electrode 102, 104, 106, 108, 110, 112. Substrate 114 is only partially shown in FIGS. 2 and 3 and can extend to support a larger number of sensing contact electrodes that are not illustrated in FIGS. 2 and 3. The sensing contact electrodes 102, 104, 106, 108, 110, 112 can be arranged in a regular rectangular array, as illustrated, or in oblique alignments. The substrate 114 is movable relative to a surface 116 (FIG. 3) along X and Y axes to provide scanning of the surface 116 by the sensing contact electrodes 102, 104, 106, 108, 110, 112. The substrate 114 is also movable by a microactuator (not illustrated in FIGS. 2 and 3) to move along a Z axis relative to the ferroelectric medium surface 116. The controlled spacing Z is typically selected to provide a desired force preload magnitude between the surface 116 and each of the sensing contact electrodes. The preload force deflects the sensing contact electrodes 102, 104, 106, 108, 110, 112 so that the sensing contact electrodes 102, 104, 106, 108, 110, 112 preferably function as springs. Relative motion between the substrate 114 and the surface 116 can be affected by motion of the substrate 114, motion of the surface 116, or motion of both the substrate 114 and the surface 116.

Substrate 114 and surface 116 are illustrated as flat elements in FIGS. 2 and 3, however, the substrate 114 and the surface 116 can have other shapes such as round cylindrical shapes. The surface 116 comprises a surface of a ferroelectric memory that is accessed by the electrodes 102, 104, 106, 108, 110, 112. Relative motion between the substrate 114 and the surface 116 can be any suitable scanning motion such as random access scanning, raster scanning, or other known surface scanning motions or patterns. With the use of multiple electrodes, a large number of bits of data can be written or read simultaneously (in parallel) to provide high speed access.

Exemplary conductor leads 118, 120, 122 run over a top surface 115 of the substrate 114 to carry information to and from the sensing contact electrodes 108, 110, 112. The conductor leads 118, 120, 122 couple to electronic circuitry (not illustrated) that can be located on the substrate surface 115 or elsewhere.

An exemplary sensing contact electrode such as sensing contact electrode 110 comprises a beam support 124 (a portion of the substrate 114) and an electrode 126. The electrode 126 can include a bent beam body 128 extending from the beam support 124 to an electrode tip face 130 spaced apart from the beam support 124. The aspects illustrated in FIGS. 1, 2 and 3 are illustrative, and other known electrode and data storage scanning arrangements can also be used as well. For example, the electrode 126 can have a linear shape as opposed to the described bent shape.

Figure 4:
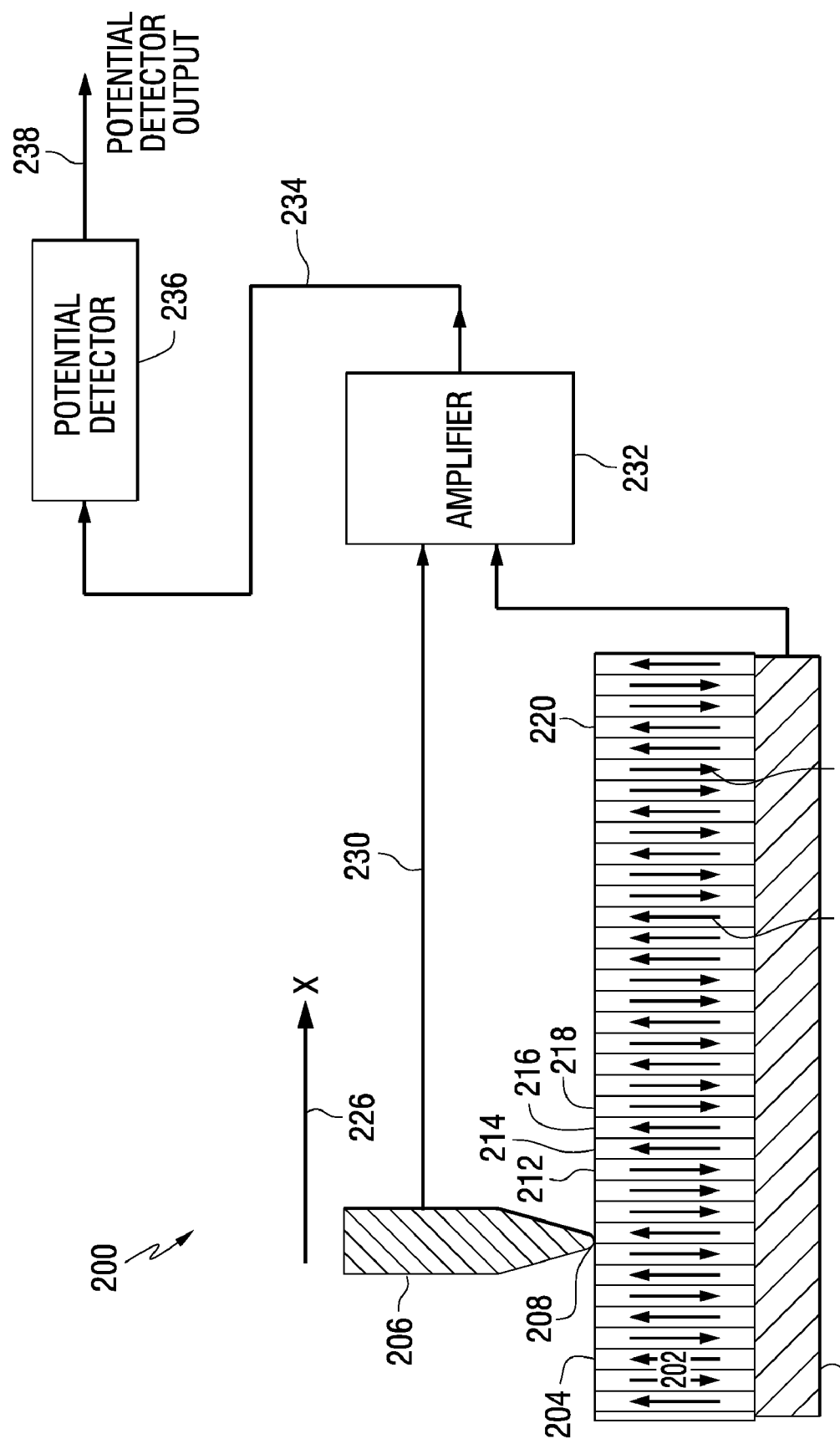
FIG. 4 illustrates a block diagram of a data storage apparatus, in accordance with an aspect of the invention.

FIG. 4 illustrates a block diagram of a data storage apparatus 200. The data storage apparatus 200 can include a data storage media 202 with a scannable surface 204. A layer (or substrate) 210 underlies the data storage media 202. The layer 210 is electrically conductive and serves as a reference potential (common return) for the data storage media 202. Other known arrangements for obtaining a reference potential of ferroelectric storage media can be used as well. The data storage media 202 and the layer 210 are illustrated in cross-section in FIG. 4. In one aspect, the scannable surface 204 comprises a generally flat surface as illustrated. In other aspects, the scannable surface 204 comprises a cylindrical surface, a tape surface or other known media surface shape. The scannable surface 204 can include a lubricant layer or other known media interface layers (not shown).

The storage media 202 includes a ferroelectric material. The storage media 202 comprises individual storage domains 212, 214, 216, 218, . . . , 220 that are selectively polarized in an up or down direction to store data. An up arrow 222 can indicate a first ferroelectric polarization (e.g., logical one) and a down arrow 224 can indicate a second ferroelectric polarization (e.g., logical zero) of the stored data. The ferroelectric polarization is non-volatile, but electrically alterable so that the storage media 202 can be used as reusable data storage media.

An electrode 206 includes an electrode tip 208 positioned adjacent the scannable surface 204. In one aspect, electrode tip 208 electrically contacts the scannable surface 204. The mechanical contact force 207 at the scannable surface 204 produces a mechanical stress in the data storage media 202 under the electrode tip 208.

The electrode 206 and the scannable surface 204 move relative to one another with a scanning motion so that the electrode mechanically scans the scannable surface 204. The scanning motion is controlled by a servo control system so that the electrode tip 208 sequentially passes over a selected sequence of storage media domains such as storage media domains 212, 214, 216, 218, . . . , 220. In one aspect, the scanning motion includes a spinning disc media and a servo controllable electrode radius on the disc media. In another aspect, the scanning motion includes X positioning of the electrode 206 and Y positioning of the scannable surface 204 under servo controls. As the electrode scans across a sequence of storage media domains 212, 214, 216, 218, . . . , 220, the electrode tip 208 senses the compensation charges of each data element. The term "scanning" used here refers to accessing data stored on media by relative interaction between an electrode and a media surface, and does not refer to switching an array of electrical conductors in stationary contact with media. The electrode tip 208 mechanically scans the storage media data domains 212, 214, 216, 218, . . . , 220 in an X direction 226 at a scanning speed to produce a time sequence of data bits that represent the data stored by ferroelectric storage.

The electrode 206 is coupled by a lead 230 to an amplifier 232. The amplifier 232 amplifies the signal at electrode 206. The amplifier 232 provides an amplifier output 234 to a potential detector 236. Potential detector 236 provides a potential detector output 238. The potential detector output 238 can include a digital output that represents the polarity of the scanned sequence of data bits. The amplifier 232 may be, for example, an operational amplifier configured in a transimpedance current or charge sensing mode. The lead 230 from the electrode 206 would be connected to the inverting input of the operational amplifier 232, while the non-inverting input of the amplifier is connected to ground. The electrode 206 is thus connected to a "virtual ground", since the operational amplifier maintains the potential of its two inputs at almost exactly the same level due to its large open-loop gain. Thus, compensation charges from the media surfaces can flow to the virtual ground, and this charge flow (current), or the amount of charge, is amplified by the transimpedance or charge sensing, respectively, configuration of the amplifier 232, to produce a potential. The potential detector 236 further amplifies the signal to a level suitable for the data processing channel. The potential detector output 238 is connectable to a read channel that includes features such as error detection and correction decoding to provide a useful readback signal to a host computer system.

Figure 5:
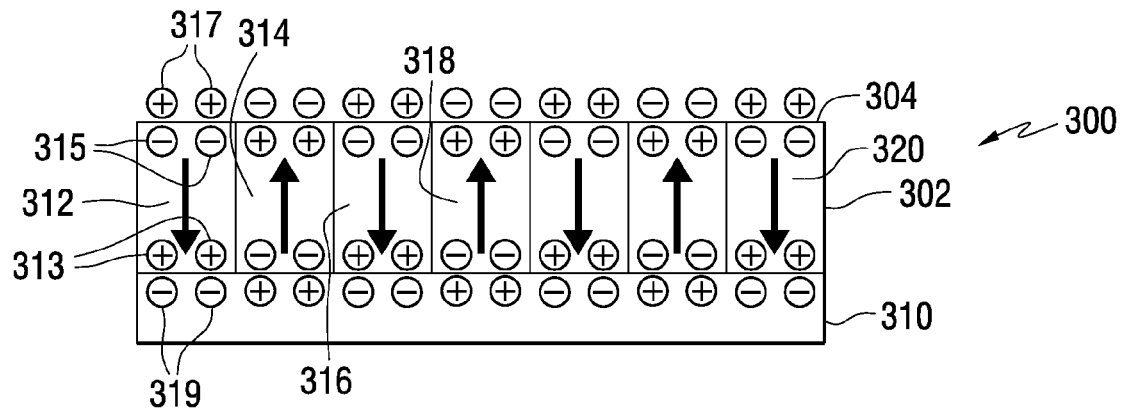
FIG. 5 illustrates a schematic representation of a ferroelectric layer and electrode layer, in accordance with an aspect of the invention.

FIG. 5 illustrates an apparatus 300, in accordance with an aspect of the invention. The apparatus 300 includes a ferroelectric layer 302 that may be, for example, $Pb(Zr_xTi_{1-x})O_3$. The ferroelectric layer 302 has a scannable surface 304. The ferroelectric layer 302 is positioned adjacent to an electrode layer 310 that is electrically conductive serving as a reference potential for the data writing process, and serving as a source of compensation charges to the bottom of the media layer in order to complete the electrical circuit. In one aspect, the ferroelectric layer 302 may be configured as a ferroelectric data storage layer.

Still referring to FIG. 5, the ferroelectric layer 302 can include individual storage domains 312, 314, 316, 318 . . . 320 that are selectively polarized in an up or down direction to, for example, store data. For example, an up arrow such as contained in domains 314 and 318 can indicate a first ferroelectric polarization (e.g., logical 1) and a down arrow such as contained in domains 312, 316, and 320 can indicate a second ferroelectric polarization (e.g., logical 0) of the stored data. Within each domain of the ferroelectric layer 302 there are contained bound charges such as, for example, positive bound charges 313 in the domain 312 at the end of the domain in the direction of polarization and negative bound charges 315 within the opposing end of the domain 312. Each domain 312, 314, 316, 318 . . . 320 may have similarly oriented bound charges as shown in FIG. 5 (but not labeled in FIG. 5 for simplification of the illustration shown in FIG. 5).

Again referring to FIG. 5, when the polarization of a domain is oriented in one direction, such as the direction of polarization indicated in domain 312, electric charges with opposite polarities to the bound charges are needed, both at the top and bottom of the ferroelectric layer 302 to compensate the polarization bound charges in order to minimize the electrostatic energy. These charges are generally referred to as compensation charges or screening charges. For example, domain 312 has compensation charges 317 that are adjacent the scannable surface 304 and compensation charges 319 that are contained in the electrode layer 310 and adjacent the surface of the ferroelectric layer 302 that is adjacent the electrode layer 310. The compensation charges 317 have a polarity that is opposite to the polarity of the bound charges 315 and similarly the compensation charges 319 have a polarity that is opposite to the polarity of the bound charges 313. It will be appreciated that each of the domains 312, 314, 316, 318 . . . 320 include compensation charges as shown in FIG. 5 (but not individually labeled in FIG. 5 for simplification of the illustration shown in FIG. 5). The source of the compensation charges may be, for example, the electrodes (either the static bottom electrode, or the write electrode during writing), free carriers from the ferroelectric material itself (e.g. electrons and holes associated with ionic vacancies, or injected from the electrodes), or charged adsorbates from the ambient, such as $OH^-$ or $H^+$.

Figure 6:
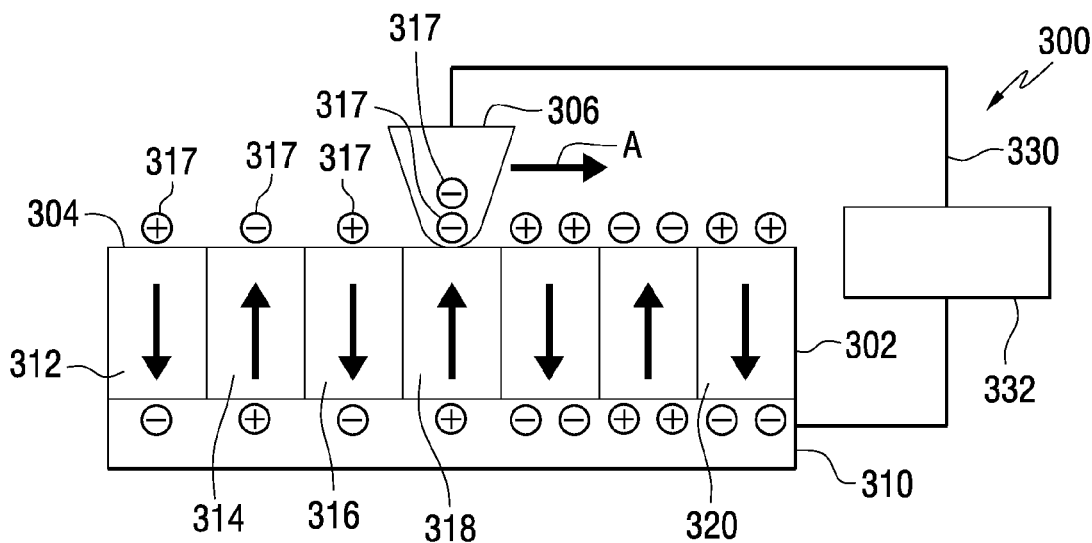
FIG. 6 illustrates a schematic representation of an electrode sensing polarity of a ferroelectric layer, in accordance with an aspect of the invention.

FIG. 6 is a schematic illustration of the apparatus 300 including an electrode 306 that is electrically connected by lead 330 to an amplifier 332 which in turn is electrically connected to the electrode layer 310. The electrode 306, the ferroelectric layer 302, and the electrode 310 form an electrical circuit which may be an electrical series. In one aspect, the apparatus 300 may be configured as a probe ferroelectric data storage device. The electrode 306 may be, for example, a transducer, probe, or probe tip that serves to perform a read and/or write operation on the ferroelectric layer 302 configured as a data storage media. The electrode 306 is positioned adjacent to the scannable surface 304 of the ferroelectric layer 302. In one aspect, the electrode 306 is in mechanical contact with the scannable surface 304.

Still referring to FIG. 6, in one aspect the electrode 306 can move in the direction indicated by arrow A in order to sense the compensation charges 317 and provide a readback signal that indicates the ferroelectric polarization direction within the individual domains 312, 314, 316, 318 . . . 320 of the ferroelectric layer 302. Specifically, movement of the electrode 306 adjacent to or in contact with the scannable surface 304 of the ferroelectric layer 302 is carried out at a zero voltage bias applied through the electrode 306 (i.e., no voltage is applied through the electrode 306 and through the electrode layer 310). When the electrode 306 scans on the scannable surface 304 of the ferroelectric layer 302, at least a portion of the compensation charges 317 are removed through either the sourcing or sinking of electrons by the amplifier 332. When the amount of compensation charges 317 is the same as that of the bound charges 315, the scanning of the electrode 306 can break the equilibrium between the bound charges 315 and the compensation charges 317 and be able to take out at least part of the compensation charges 317. When the amount of the compensation charges 317 is more than that of the bound charges 315, the excess compensation charges can be easily picked up by the grounded electrode 306 that behaves like a charge drain.

Figure 7:
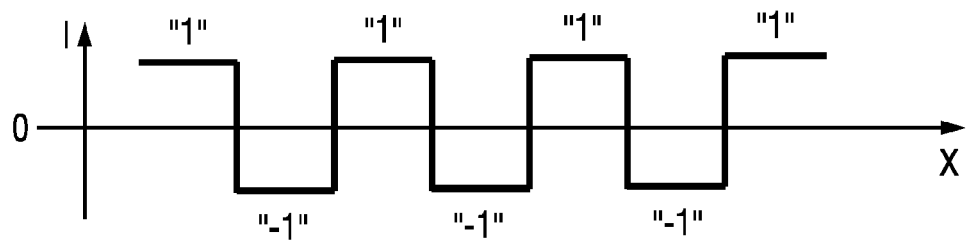
FIG. 7 illustrates graphically a current flow corresponding to FIG. 6, in accordance with an aspect of the invention.

FIG. 7 corresponds to FIGS. 5 and 6 and graphically illustrates current flow formed by the removal of compensation charges 317 from each polarization domain 312, 314, 316, 318, . . . 320 of the ferroelectric layer 302 when the electrode 306 scans on the scannable surface 304 of the ferroelectric layer 302. Polarization domains with a positive compensation charge 317, e.g. domains 312, 316 and 320, on the scannable surface 304 of the ferroelectric layer 302 are represented by a binary "1" in FIG. 7, resulting from sourcing of electrons by the amplifier 332. Polarization domains with a negative compensation charge 317, e.g. domains 314 and 318, on the scannable surface 304 of the ferroelectric layer 302 are represented by a binary "−1" in FIG. 7, resulting from sinking of electrons by the amplifier 332.

In accordance with an aspect of the invention, a method is provided for sensing the polarization of a ferroelectric layer utilizing compensation charges that exist in association with the ferroelectric layer. The method includes providing a ferroelectric layer 302 with a scannable surface 304 and an electrode 306 adjacent the scannable surface 304. The method also includes sensing a compensation charge 317 that is adjacent to scannable surface 314 of the ferroelectric layer 302. The method can further include configuring the ferroelectric layer 302 as a data storage layer. The method encompasses the electrode 306 removing at least part of the compensation charge 317. As described herein, the ferroelectric layer 302 has a plurality of domains 312, 314, 316, 318 . . . 320 each having a polarization wherein the compensation charge 317 corresponding to each domain is a function of the polarization of each domain. The method can include configuring the ferroelectric layer 302 and the electrode 306 to form a data storage device.

It will be appreciated that aspects of the invention provide for determining the ferroelectric polarization direction of domains contained within a ferroelectric layer by sensing compensation charges adjacent the ferroelectric layer. The compensation charges provide a feedback signal that allows for determining the ferroelectric polarization direction. This can be done without switching the polarization direction of the individual domains of the ferroelectric layer 302, i.e., in a non-destructive manner. Such an arrangement is advantageous for a probe ferroelectric data storage system wherein certain previous readback schemes involved destructive readback techniques. It will be further appreciated that aspects of the invention for non-destructive readback, as described herein, could be used in association with other readback techniques such as, for example, destructive readback techniques. For example, the domains of a ferroelectric layer could be determined using aspects of the invention that are non-destructive (i.e., sensing the compensation charges without switching the polarization) and then a destructive readback technique (i.e., actually applying a bias voltage to switch the ferroelectric polarization direction) could be applied to verify the accuracy of the non-destructive readback.

The implementation described above and other implementations are within the scope of the following claims.

What is claimed is:

1. An apparatus, comprising:
   a ferroelectric layer with a scannable surface, the ferroelectric layer having a compensation charge adjacent the scannable surface and a plurality of individual domains each having a polarization direction; and
   an electrode in contact with the scannable surface to sense the compensation charge which provides a feedback signal for determining the polarization direction of the individual domains without switching the polarization direction of the individual domains.

2. The apparatus of claim 1, wherein the electrode removes at least part of the compensation charge.

3. The apparatus of claim 1, wherein the compensation charge corresponding to each domain is a function of the polarization of each domain.

4. The apparatus of claim 3, wherein the ferroelectric layer is configured as a data storage layer.

5. The apparatus of claim 1, wherein the ferroelectric layer is configured as a data storage layer.

6. The apparatus of claim 1, wherein the electrode is configured as a probe for data storage.

7. The apparatus of claim 1, further comprising an electrode layer adjacent to a bottom surface of the ferroelectric layer, wherein the bottom surface is generally opposite from the scannable surface of the ferroelectric layer.

8. The apparatus of claim 7, wherein the electrode layer has an additional compensation charge adjacent the bottom surface of the ferroelectric layer.

9. The apparatus of claim 7, wherein the electrode, the ferroelectric layer and the electrode layer form an electrical circuit.

10. The apparatus of claim 9, wherein the electrical circuit generates the feedback signal.

11. The apparatus of claim 10, wherein the feedback signal is a function of the compensation charge adjacent the scannable surface of the ferroelectric layer.

12. The apparatus of claim 10 further comprising an amplifier that receives the feedback signal and provides a corresponding amplified output; and a detector that receives the amplified output and generates a detector output that indicates the polarization direction.

13. A method, comprising:
providing a ferroelectric layer with a scannable surface and a plurality of individual domains each having a polarization direction;
providing an electrode in contact with the scannable surface; and
sensing with the electrode a compensation charge that is adjacent the scannable surface of the ferroelectric layer ,wherein the compensation charge provides a feedback signal for determining the polarization direction of the individual domains without switching the polarization direction of the individual domains.

14. The method of claim 13, further including configuring the ferroelectric layer as a data storage layer.

15. The method of claim 13, further including the electrode removing at least part of the compensation charge.

16. The method of claim 13, wherein the compensation charge corresponding to each domain is a function of the polarization of each domain.

17. The method of claim 13, further including configuring the ferroelectric layer and the electrode to form a data storage device.

18. The method of claim 13 wherein the sensing step further comprises amplifying the feedback signal and providing a amplified output; and receiving the amplified output at a detector and generating a detector output that indicates the polarization direction.

19. A circuit, comprising:
a ferroelectric electrode scanning system having data stored thereon with a data polarity, the scanning system sensing a compensation charge as a function of the data polarity which provides a feedback signal for determining the data polarity without switching the data polarity;
an amplifier that receives the feedback signal and provides a corresponding amplified output; and
a detector that receives the amplified output and generates a detector output that indicates the data polarity.

20. The circuit of claim 19, wherein the scanning system includes an electrode in contact with a scannable surface of a ferroelectric data storage layer.

21. The circuit of claim 20, wherein the scanning system includes an electrode layer adjacent to a non-scannable surface of the ferroelectric data storage layer such that the electrode, the ferroelectric data storage layer and the electrode layer are in electrical series.

* * * * *